United States Patent
Ouellet et al.

(10) Patent No.: US 6,724,967 B2
(45) Date of Patent: Apr. 20, 2004

(54) METHOD OF MAKING A FUNCTIONAL DEVICE WITH DEPOSITED LAYERS SUBJECT TO HIGH TEMPERATURE ANNEAL

(75) Inventors: Luc Ouellet, Granby (CA); Annie Dallaire, St-Cesaire (CA)

(73) Assignee: Dalsa Semiconductor Inc., Waterloo (CA)

( * ) Notice: Subject to any disclaimer, the term of this patent is extended or adjusted under 35 U.S.C. 154(b) by 142 days.

(21) Appl. No.: 09/799,491

(22) Filed: Mar. 7, 2001

(65) Prior Publication Data
US 2002/0064359 A1 May 30, 2002

(30) Foreign Application Priority Data
Nov. 25, 2000 (CA) .............................................. 0028822

(51) Int. Cl.⁷ ................................................. G02B 6/10
(52) U.S. Cl. ......................... 385/130; 385/15; 65/385; 65/378; 65/32.4; 65/32.5; 438/976; 438/970
(58) Field of Search .................. 385/130, 15; 359/115; 65/385, 378, 32.4, 32.5; 438/976, 970, 977

(56) References Cited

U.S. PATENT DOCUMENTS

| | | | |
|---|---|---|---|
| 4,830,984 A | 5/1989 | Purdes | 437/126 |
| 5,674,304 A | 10/1997 | Fukada et al. | 65/32.4 |
| 5,930,664 A * | 7/1999 | Hsu et al. | 438/612 |
| 6,346,445 B1 * | 2/2002 | Hsu | 438/279 |

FOREIGN PATENT DOCUMENTS

| | | |
|---|---|---|
| EP | 0 304 709 A2 | 8/1988 |
| EP | 0 455 360 A1 | 4/1991 |
| JP | 56038492 | 3/1981 |
| JP | 63-184708 | 7/1988 |
| JP | 05006367 | 1/1993 |

OTHER PUBLICATIONS

"Four–channel wavelength division multiplexers and band–pass filters based on elliptical bragg reflectors", Charles H. Henry et al., Journal of lightwave technology, vol. 8, No. 5, May 1990, pp. 748–755.

"Less than 1 dB per meter propagation loss of silica waveguides measured using a ring resonator", R. Adar et al., Journal of Lightwave Technology, vol. 12, No. 8, Aug. 1994.

"Improved waveguide technology for silica–on–silicon integrated optics", P.R. Wensley et al., pp. 9–8 to 9–9.

"Silica glass waveguide structure and its application to a multi–demultiplexer", Katsuyuki Imoto et al., pp. 577–580.

"High–silica guided–wave optical devices", Katsuyuki Imoto et al., IEEE, 1991, pp. 483–488.

"New integrated optical multiplexer–demultiplexer realized on silicon substrate", S. Valette et al., pp. 145–147.

"Glass waveguides on silicon for hybrid optical packaging", C.H. Henry et al., Journal of Lightwave Technology, vol. 7, No. 10, Oct. 1989, pp. 1530–1539.

"Low–loss PECVD silica channel waveguides for optical communications", Electronics Letters, Dec. 1990, vol. 26, No. 25, pp. 2135–2137.

(List continued on next page.)

*Primary Examiner*—Toan Ton
*Assistant Examiner*—George Wang
(74) *Attorney, Agent, or Firm*—Marks & Clerk

(57) ABSTRACT

A method is disclosed for making a device having one or more deposited layers and subject to a post deposition high temperature anneal. Opposing films having similar mechanical properties are deposited on the front and back faces of a wafer, which is subsequently subjected a high temperature anneal. The opposing films tend to cancel out stress-induced warping of the wafer during the subsequent anneal.

11 Claims, 1 Drawing Sheet

OTHER PUBLICATIONS

"Plasma–enhanced chemical vapor deposition of low–loss SiOn optical waveguides at 1.5–um wavelength", Franco Bruno et al., Applied Optics, vol. 30, No. 31, Nov. 1991, pp. 4560–4564.

"Simple technologies for fabrication of low–loss silica waveguides", Q. Lai et al.

"Formation of optical slab waveguides using thermal oxidation of SiOx", Q. Lai et al., Electronics Letters, Apr. 1993, vol. 29, No. 8, pp. 714–716.

"Hybrid optoelectronic digitally tunable receiver", Karen Liu et al., SPIE, vol. 2402, pp. 104–114.

Single–mode SiOn/SiO2/Si optical waveguides prepared by plasma–enhanced chemical vapor deposition, Yuan–Kuang Tu et al., Fiber and Integrated Optics, vol. 14, pp. 133–139.

"Low temperature, nitrogen doped waveguides on silicon with small core dimensions fabricated by PECVD/RIE", M. Hoffmann et al., pp. 299–301.

"Optical properties of thin–film silicon–compatible materials", Daniel P. Poenar et al., Applied Optics, vol. 36, No. 21, Jul. 1997, pp. 5122–5128.

Low–loss fiber–matched low–temperature PECVD waveguides with small–core dimensions for optical communication systems, Martin Hoffmann et al., IEEE Photonics Technogoy Letters, vol. 9, No. 9, Sep. 1997, pp. 1238–1240.

"High quality low temperature DPECVD silicon dioxide", I. Pereyra et al., Journal of Non–Crysalline Solids, 1997, pp. 225–231.

"A luminescence study of silicon–rich silica and rare–earch doped silicon–rich silica", A.J. Kenyon et al., Electrochemical Society Proceedings, vol. 97–11, pp. 304–316.

Thick SiOxNy and SiO2 films obtained by PECVD technique at low temperatures, M.I. Alayo et al., Thin Solid Films 332, 1998, pp. 40–45.

Deposition of thick TEOS PECVD silicon oxide layers for integrated optical waveguide applications, D.A.P. Bulla et al., Thin Solid Films 334, 1998, pp. 60–64.

State of the art of integrated optics technology at LETI for achieving passive optical components, S. Valette, Journal of Modern Optics, 1988, vol. 35, No. 6, pp. 993–1005.

"Simple method of fabricating polarisation–insensitive and very low crosstalk AWG grating devices", S.M. Ojha et al., Electronics Letters, Jan. 1998, vol. 34, No. 1, pp. 78–79.

"Thermal annealing of waveguides formed by ion implantation of silica–on–Si", C.M. Johnson et al., Nuclear Instruments and Methods in Physics Research B 141, 1998, pp. 670–674.

"Silicon oxynitride planar waveguiding structures for application in optical communication", Rene M. de Ridder, IEEE Journal of Selected Topics in Quantum Electroncis, vol. 4, No. 6, 1988, pagse 930–936.

"Polarisation–insensitive arrayed–waveguide gratings using dopant–rich silica–based glass with thermal expansion adjusted to Si substrate", S. Suzuki et al., Electronic Letters, Jun. 1997, vol. 33, No. 13, pp. 1173–1174.

"Polarization–insensitve arrayed–waveguide wavelength multiplexer with birefringence compensating film", Hiroshi Takahashi et al., IEEE Photonics Technology Letters, vol. 5, No. 6, Jun. 1993, pp. 707–709.

"Silica waveguides on silicon and their application to integrated–optic components", Masao Kawachi, Optical and Quantum Electronics 22, 1990, pp. 391–416.

"Integrated four–channel mach–zehnder multi/demultiplexer fabricated with phosphorous doped SiO2 waveguides on Si" B.H. Verbeek et al., Journal of Lightwave Technology, vol. 6, No. 6, Jun. 1988, pp. 1011–1015.

"Silicon–oxynitride layers for optical waveguide applications", R. Germann et al., Abstract No. 137.

"Plasma enhanced chemical vapor deposition silicon oxynitride optimized for application in integrated optics", K. Worhoff et al., Sensors and Actuators 74, 1999, pp. 9–12.

"Wavelength tunable optical add–after–drop filter with flat passband for WDM networks", B.J. Offrein et al., IEEE Photonics Technology Letters, vol. 11, No. 2, Feb. 1999, pp. 239–241.

* cited by examiner

METHOD OF MAKING A FUNCTIONAL DEVICE WITH DEPOSITED LAYERS SUBJECT TO HIGH TEMPERATURE ANNEAL

BACKGROUND OF THE INVENTION

This invention relates to a method of making functional devices, such as optical Multiplexers (Mux) and Demultiplexers (Dmux), that have at least one film deposited on a wafer and are subject to a high temperature anneal that induces warping in the wafer.

Multiplexers (Mux) and Demultiplexers (Dmux) need silica waveguides that require the introduction of high performance (i.e. extremely transparent in the 1.50–1.55 wavelength range) silica films on a silicon wafer.

Typically the optical silica films used to form the waveguides are deposited over a silicon wafer by PECVD at a relatively low temperature of 400° C. The deposited PECVD silica films do not have sufficiently high performance as deposited due to some absorption peaks causing optical absorption in the 1.50–1.55 wavelength range.

In order to eliminate these residual absorption peaks, an anneal at a high temperature ranging between 700 and 1200° C. is required. Because of the difference in thermal expansion between the PECVD deposited silica films and the underlying silicon wafer, the mechanical stress in the silica films increases as the temperature of the silicon-silica films structure is increased and a polarization dependence is observed.

At a temperature exceeding about 600° C., the mechanical stress in the silica films reaches a plateau and does not increase as much with any further increase of temperature. As the temperature is increased over 600° C., a plastic deformation of the silica films occurs and a stress-temperature hysteresis is observed as the temperature of the silica films/wafer structure is reduced back to room temperature. The consequence of the stress-temperature hysteresis is that the room temperature mechanical stress of the PECVD silica films following the high temperature anneal over 600° C. is much more compressive than the room temperature mechanical stress prior to the anneal.

The effect of the induced compressive mechanical stress in the high temperature annealed PECVD silica films is a significant warp of underlying the silicon wafer, which results in a low yield photolithography processing: i.e. the silicon wafer cannot be processed reliably. Moreover, in the event that such a wafer could be processed, the resulting patterned optical silica films show a polarization dependence problem caused by the birefringence originating from this large compressive stress in the silica films.

It is indeed well known that the manufacture of satisfactory Mux/Dmux devices is a very difficult task. Various approaches to the problem have been considered.

Flame Hydrolysis Deposition (FHD) Technique

The optical silica films can be deposited on the silicon wafer at a very high temperature using the Flame Hydrolysis Deposition (FHD) technique which involves the fusion in hydrogen, oxygen and other gases of fine glass particles followed by some post-deposition anneals to 1200–1350° C. (Suzuki S., Polarization insensitive arrayed-waveguide gratings using dopant-rich silica-based glass with thermal coefficient adjusted to silicon substrate, Electron. Lett. 33 (13), 1173, 1997). In this case, the silica films are doped with a high concentration of germanium to increase its Thermal Coefficient of Expansion (TCE) and to try to match the TCE of the underlying silicon wafer, thus minimizing the warp of the underlying silicon wafer (that results from the difference of TCE between the silica films and the silicon wafer) and the associated polarization dependence.

In another similar reference, also using the Flame Hydrolysis Deposition (FHD) technique, a sputter deposited amorphous silicon layer over the silica films (to match the TCE of the underlying silicon wafer) is used to minimize the associated wafer warp and associated polarization dependence of the waveguide. (Takahashi H., Polarization-insensitive arrayed waveguide wavelength multiplexer with birefringence compensating film, IEEE Photon. Tech. Lett. 5 (6), 707, 1993).

In a third similar reference, also using the Flame Hydrolysis Deposition (FHD) technique, a quartz wafer (with a better matching the TCE of the silica films) replaces the silicon wafer as to minimize the residual compressive stress of the silica films after anneals and their polarization dependence. (Kawachi M., Silica waveguides on silicon and their application to integrated-optic components, Optical and quantum Electronics, 22, 391, 1990).

High Pressure Steam Deposition (HPSD) Technique

The optical silica films can be grown from silicon at very high temperature using the High Pressure Steam (HPS) technique followed by chemical vapor deposition of phosphorus-doped silica deposition and by a very high temperature anneal at about 1000° C. (Verbeek B., Integrated four-channel Mach-Zehnder multi-demultiplexer fabricated with phosphorus doped SiO2 waveguides on Si, J. Lightwave tech., 6 (6), 1011, 1988; Henry C., Four-channel wavelength division multiplexers and bandpass filters on elliptical Bragg reflectors, J. Lightwave tech., 8 (5), 748, 1990; Adar R., Less than 1 dB per meter propagation loss of silica waveguides measured using a ring oscillator, J. Lightwave tech., 12 (8), 1369, 1994) These references do not address the wafer warp problem

Electron-Beam Vapor Deposition (EBVD) Technique

The optical silica films can be deposited at a lower temperature of about 350° C. by Electron-Beam Vapor Deposition (EBVD) followed by very high temperature anneals at 1200° C. (Imoto K., Silica Glass waveguide structure and its implication to a multi/demultiplexer, ECOC, 577, 1988; Imoto K., High-silica guided-wave optical devices, $41^{st}$ ECTC, 483, 1991).

In these cases the minimization of wafer warp and of the associated polarization dependence is achieved by doping the silica films with a high concentration of germanium or titanium as to match the TCE of the silica films with the underlying quartz wafer.

Other PECVD Techniques

Other references, using PECVD techniques, describe the need for high temperature anneals of the PECVD silica films as to eliminate the residual optical absorption peaks (Valette S., New integrated optical multiplexer-demultiplexer realized on silicon substrate, ECIO '87, 145, 1987; Henry C., Glass waveguides on silicon for hybrid optical packaging, J. Lightwave tech., 7 (10), 1350, 1989; Grand G., Low-loss PECVD silica channel waveguides for optical communications, Electron. Lett., 26 (25), 2135, 1990; Bruno F., Plasma-enhanced chemical vapor deposition of low-loss SiON optical waveguides at 1.5-$\mu$m wavelength, Applied Optics, 30 (31), 4560, 1991; Lai Q., Simple technologies for fabrication of low-loss silica waveguides, Elec. Lett., 28 (11), 1000, 1992; Lai Q., Formation of optical slab waveguides using thermal oxidation of SiOx, Elec. Lett., 29 (8), 714, 1993; Liu K., Hybrid optoelectronic digitally tunable receiver, SPIE, Vol 2402, 104, 1995; Tu Y., Single-mode SiON/SiO2/Si optical waveguides prepared by plasma-enhanced Chemical vapor deposition, Fiber and integrated optics, 14, 133, 1995; Hoffmann M., Low temperature, nitrogen doped waveguides on silicon with small core dimensions fabricated by PECVD/RIE, ECIO'95, 299, 1995; Poenar D., Optical properties of thin film silicon-compatible materials, Appl. Opt. 36 (21), 5112, 1997; Hoffmann M., Low-loss fiber-matched low-temperature PECVD waveguides with small-core dimensions for optical communication systems, IEEE Photonics Tech. Lett., 9 (9), 1238, 1997; Pereyra I., High quality low temperature DPECVD silicon dioxide, J. Non-Crystalline Solids, 212, 225, 1997; Kenyon T., A luminescence study of silicon-rich silica and rare-earth doped silicon-rich silica, Fourth Int. Symp. Quantum Confinement Electrochemical Society, 97-11, 304, 1997; Alayo M., Thick SiOxNy and SiO2 films obtained by PECVD technique at low temperatures, Thin Solid Films, 332, 40, 1998; Bulla D., Deposition of thick TEOS PECVD silicon oxide layers for integrated optical waveguide applications, Thin Solid Films, 334, 60, 1998; Valette S., State of the art of integrated optics technology at LETI for achieving passive optical components, J. of Modern Optics, 35 (6), 993, 1988; Ojha S., Simple method of fabricating polarization-insensitive and very low crosstalk AWG grating devices, Electron. Lett., 34 (1), 78, 1998; Johnson C., Thermal annealing of waveguides formed by ion implantation of silica-on-Si, Nuclear Instruments and Methods in Physics Research, B141, 670, 1998; Ridder R., Silicon oxynitride planar waveguiding structures for application in optical communication, IEEE J. of Sel. Top. In Quantum Electron., 4 (6), 930, 1998; Germann R., Silicon-oxynitride layers for optical waveguide applications, $195^{th}$ meeting of the Electrochemical Society, 99-1, May 1999, Abstract 137, 1999; Worhoff K., Plasma enhanced cyhemical vapor deposition silicon oxynitride optimized for application in integrated optics, Sensors and Actuators, 74, 9, 1999; Offrein B., Wavelength tunable optical add-after-drop filter with flat passband for WDM networks, IEEE Pphotonics Tech. Lett., 11 (2), 239, 1999).

Amazingly, only one of these references (Ojha, 1998) addresses the upper mentioned wafer warp and polarization dependence problems by mentioning that the elimination of these was achieved by adjusting the TCE of the silica glass to the silicon wafer by increasing its doping with large concentrations of germanium, boron or phosphorus.

SUMMARY OF THE INVENTION

According to the present invention there is provide a method of making a device having at least one deposited layer and subject to a post deposition high temperature anneal, comprising the steps of providing a wafer having a front and back face; depositing opposing films on each said face of said wafer, said opposing films having similar mechanical properties; and subsequently subjecting said wafer to said high temperature anneal, whereby said opposing films tend to cancel out stress-induced warping of said wafer during said anneal.

The high temperature anneal should typically be carried out at a temperature above about 600° C., preferably between 600 and 900° C.

The opposing films should have similar mechanical properties so that the stress induced effects are canceled out as the wafer is subjected to the high temperature anneal. Preferably this is achieved by making them the same composition and thickness, but it would be theoretically possible to use different films so long as the mechanical effects canceled out.

In a preferred aspect, the invention involves the use of a special technique involving the deposition of thick PECVD silica films on the back face of the silicon wafer in order to prevent the wafer warp problem following these required high temperature anneals and to achieve a stable manufacturing of high performance high temperature annealed PECVD optical silica films with lower polarization dependence.

The invention also teaches a technique for introducing Plasma Enhanced Chemical Vapor Deposition (PECVD) silica waveguides in Mux and Dmux optical devices while eliminating the wafer warp problem and minimising the polarization dependence problem (caused by birefringence, i.e. the pass wavelengths of the Mux differ for the TE and TM modes) associated with the high temperature anneals that are required in order to reduce the optical absorption of thick optical silica films serving as waveguides.

The optical silica films deposited on a silicon wafer by PECVD at a relatively low temperature of 400° C. may also require a further post-deposition anneal at a high temperature ranging between 700 and 1200° C. in order to eliminate the residual optical absorption peaks.

A unique technical aspect of this invention is the deposition of thick PECVD silica films on the back face of the silicon wafer in order to prevent the wafer warp problem and to minimize the polarization dependence following these required high temperature anneals so as to achieve the stable manufacture of high performance high temperature annealed PECVD optical silica films with lower polarization dependence. The silica film on the back face compensates for the stress induced warp arising during the high temperature anneal caused by the silica film on the front face.

In a preferred embodiment, a temporary protective film is deposited on the front face. This is etched away after deposition of the film on the back face. During this etch step, the film on the back face also gets etched, so the initial thickness of the film on the back face is increased by an amount equal to the portion of the deposited layer that is etched away during this subsequent etch step so that the final thickness of the film on the back face is the same as the thickness of the film deposited on the front face.

The invention also provides a functional device, comprising a wafer having front and back faces; a layer deposited on the front face of said wafer to provide said device with its functional properties; and a matching layer deposited on the back face of said wafer to compensate for stress induced warp during an anneal step in the manufacture of said device.

BRIEF DESCRIPTION OF THE DRAWINGS

The invention will now be described in more detail, by way of example only, with reference to the accompanying drawings, in which.

DETAILED DESCRIPTION OF PREFERRED EMBODIMENTS

Figure 1:
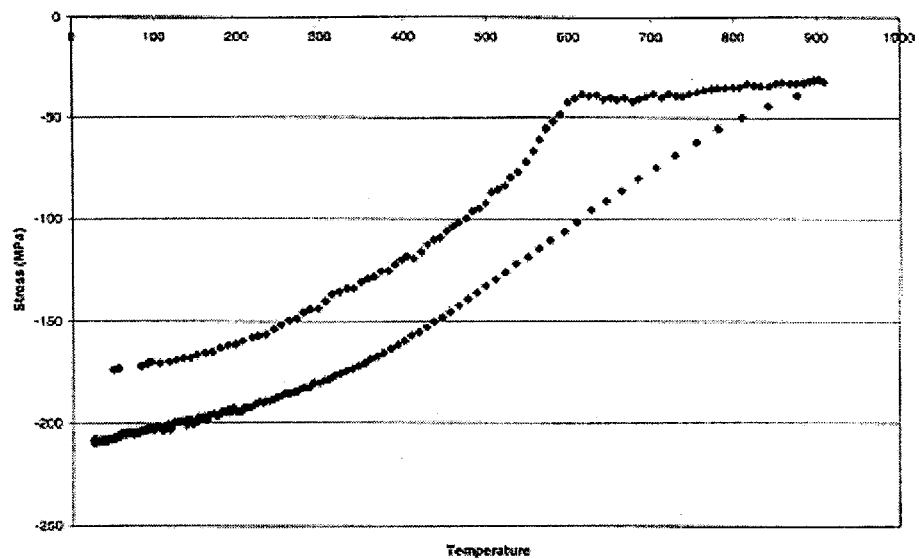
FIG. 1 is a graph showing of stress hysteresis showing plastic deformation of PECVD silica films over 600° C.
Figure 2A:
FIGS. 2a to 2d show the successive steps in the fabrication of a device in accordance with the principle of the invention.
Figure 2B:
Figure 2C:
Figure 2D:
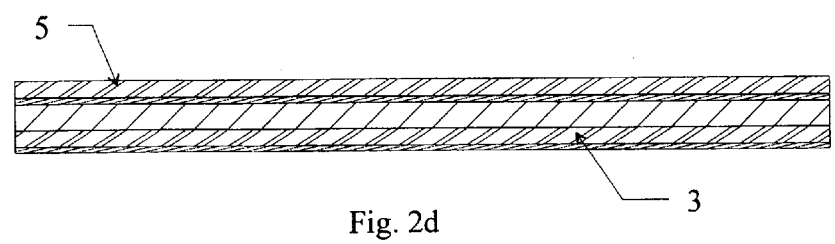

The difference in TCE between the PECVD deposited silica films and the underlying silicon wafer causes a large stress hysteresis when the post-deposition anneal temperature exceeds 600° C. The higher the anneal temperature, the more the compressive stress. This effect is shown in FIG. 1.

As mentioned before, the consequence of this stress-temperature hysteresis is that the room temperature mechanical stress of the PECVD silica films following these high temperature anneals is highly compressive and induces a large warp of underlying the silicon wafer, which results in a low yield photolithography processing and in a polarization dependence of the waveguide.

Example

Referring to FIGS. 2a to 2d, a device in accordance with the invention is made by first depositing a 0.5 μm thick PECVD silica film 2 on front face of a silicon wafer 1. The purpose of this film is to provide protection against scratches from the PECVD wafer handling robot and from particles accumulating on the front face of the silicon wafer when processed face down.

Next a 13.5 μm thick PECVD silica film 3 is deposited on the back face of the silicon wafer. This film is similar in composition and thickness to the silica film that will be later deposited on the front face of the silicon wafer to form the silica waveguides.

The wafer is then lightly etched for about 5 minutes in a 17:1 Buffered Oxide Etch (BOE) so as to completely remove the 0.5 μm thick PECVD silica film 2 deposited on the front face of the silicon wafer and to leave a 13 μm thick PECVD silica film 3 on the back of the silicon wafer, thus lifting-off any particles/scratches left on the front face of the silicon wafer from the PECVD wafer handling robot.

Megasonic cleaning (a solution at room temperature composed of: 3.9 liters of hydrogen peroxide, H2O2; 3.9 liters of ammonium hydroxide, NH4OH; and 2.1 liters of deionized water) of the front face of the silicon wafer is then carried out so as to remove any residual particles.

Next a low Pressure Chemical Vapor Deposition (LPCVD) step is performed at about 800° C. to deposit a 0.15 μm thick silicon nitride film 4 on both faces of the silicon wafer so as to protect the back silica film during subsequent silica etching.

A 13 thick PECVD silica film 5 is then formed on the front face of the silicon wafer. The film 5 is similar in composition and thickness to the silica film remaining on the back face of the silicon wafer. This film 5 forms the silica waveguide.

A first high temperature anneal between 600 and 900° C. is carried out so as to allow silica film stabilization for subsequent photolithography steps and to compensate for the heat treatment at about 800° C. that the silica film 3 on the back face of the silicon wafer experienced during the silicon nitride deposition.

After carrying out subsequent photolithography steps, a final high temperature anneal between 700 and 1100° C. is carried out so as to reduce the optical absorption of the silica waveguides.

Various alternatives embodiments will now be considered, although it should be understood that the following does not represent an exhaustive list, and is given by way of example only.

The 0.5 μm thick PECVD silica film 2 deposited on the front face of the silicon wafer could be deposited by a number of methods, including Low Pressure Chemical Vapor Deposition; Metal Organic Vapor Deposition; Electron Cyclotron Resonance Deposition; and RF Sputtering. It could be thinner than 0.5 μm if the scratches and/or particles generated by the film deposition on the back face of the silicon wafer are very small. In that case, an equivalent reduction in the initial thickness of the film 3 on the back face would be required so that during the subsequent light etching the film 3 is reduced to the same final thickness to ensure that the thickness of the finished films 3 and 5 is the same.

The film 2 might need to be thicker than 0.5 μm if the scratches and/or particles generated by the film deposition on the back face of the silicon wafer are large. In that case, an equivalent increase in thickness of the film 3 deposited on the back face would be required so that during the subsequent light etching step, the film 3 is etched to the same final thickness.

The film 2 could also be doped with Phosphorus, Boron, Germanium or Titanium. In that case, an equivalent doping with the same species would be recommended for the film deposited on the back face.

The 13.5 μm thick PECVD silica film 3 deposited on the back face of the silicon wafer could be deposited by a number of techniques including Low Pressure Chemical Vapor Deposition; Metal Organic Vapor Deposition; Electron Cyclotron Resonance Deposition; and RF Sputtering. It might be thinner than 13.5 μm if required for the waveguides. In that case, an equivalent reduction in thickness of the 13 μm thick film deposited on the front face would be desirable.

The film 3 could also of course be thicker than 13.5 μm if it was required to form a film thicker than 13 μm thick film on the front face for the purpose of forming a waveguide.

The film 3 could also be doped with Phosphorus, Boron, Germanium or Titanium. In that case, an equivalent doping with the same species would be desirable for the film 5 deposited on the front face.

The light etching for about 5 minutes in a 17:1 Buffered Oxide Etch (BOE) to completely remove the 0.5 μm thick PECVD silica film 2 deposited on the front face of the silicon wafer could be longer than 5 minutes if the PECVD silica film deposited on the front face of the silicon wafer is to be thicker than the proposed 0.5 μm; shorter than 5 minutes if the PECVD silica film deposited on the front face of the silicon wafer is to be thinner than the proposed 0.5 μm; or done in another wet etch solution than the 17:1 Buffered Oxide Etch (BOE).

The Megasonic cleaning (a solution at room temperature composed of: 3.9 liters of hydrogen peroxide, H2O2; 3.9 liters of ammonium hydroxide, NH4OH; and 2.1 liters of deionized water) of the front face of the silicon wafer could be done in another cleaning solution than the proposed Megasonic cleaning solution if suitable for removal of any residual particles; or done at a temperature different than room temperature if suitable for the removal of any residual particles.

The Low Pressure Chemical Vapor Deposition (LPCVD) step at about 800° C. of a 0.15 μm thick silicon nitride film 4 on both faces of the silicon wafer could be performed at a different temperature than the proposed 800° C. if the silicon nitride film properties are sufficient to protect the back silica film during subsequent silica etching on the front face; be replaced by another deposition technique of silicon nitride such as batch Plasma Enhanced Chemical Vapor Deposition or any other deposition technique capable of depositing the silicon nitride film on both faces of the silicon wafer; be thinner or thicker film than stated if the obtained film is effective to protect the back silica film during subsequent silica etching; be replaced by another deposition technique of another protection film than the proposed silicon nitride if the other protection film is effective to protect the back silica film during subsequent silica etching; or be eliminated in the case there is no need to protect the back silica film during subsequent silica etching on the front face (e.g. by using an etching technique that does not modify the silica on the back side of the silicon wafer);

The 13 μm thick PECVD silica film 5 on the front face of the silicon wafer could be deposited by Low Pressure Chemical Vapor Deposition; deposited by Metal Organic Vapor Deposition; deposited by Electron Cyclotron Resonance Deposition; deposited by RF Sputtering; thinner than 13 μm if the equivalent film deposited on the back face is thinner than 13.5 μm; thicker than 13 μm if the equivalent film deposited on the back face is thicker than 13.5 μm; or doped with Phosphorus, Boron, Germanium or Titanium if an equivalent doping with the same species is used for the film deposited on the back face.

The first high temperature anneal between 600 and 900° C. to allow silica film stabilization for subsequent photolithography steps and to compensate for the heat treatment at about 800° C. could be eliminated and/or displaced and replaced by the final high temperature anneal if silica film stabilization is not required for subsequent photolithography steps, i.e. if the deposition temperature of the silicon nitride or alternate film is performed at a temperature lower than 600° C.; eliminated if a silicon nitride or alternate film is not required (in the case there is no need to protect the back silica film during subsequent silica etching on the front face of the silicon wafer).

The final high temperature anneal between 700 and 1100° C. to reduce the optical absorption of the silica waveguides could be moved to another position in the sequence.

The principal application of the invention is in the fabrication of optical Mux/deMux devices, but the invention can also be applied to any other manufacturing processes involving the use of thick (thicker than 5 μm) silica; doped silica; alternate dielectric films; semiconductor films; metallic films on substrates such as silicon wafers; III–V compound semiconductor wafers; II–VI compound semiconductor wafers; Quartz; Saphire; Alumina.

Apart from Mux/Dmux devices, the invention can be applied, for example, to other photonics devices; semiconductor devices; Micro Electro Mechanical Systems (MEMS); Bio-chips; Lab-on-a-chip devices; and multi-chip modules.

What is claimed is:

1. A method of making an optical multiplexer/demultiplexer comprising the steps of:
   providing a silicon wafer having a front and back face;
   depositing a first silica film having a first thickness on said front face td protect said front face during handling of said wafer;
   depositing a second silica film having a second thickness greater than said first thickness on said back face;
   exposing said wafer to an etchant to remove said first silica film from said front face, said etchant reducing the thickness of said second silica film to a third thickness substantially equal to said second thickness less said first thickness;
   depositing a third silica film forming an optical waveguide on said front face and having said third thickness; and
   subsequently subjecting said wafer to said high temperature anneal whereby said second and third silica films act in opposition to prevent stress-induced warping of said wafer from occurring during said high temperature anneal.

2. A method as claimed in claim 1, wherein first thickness is about 0.5 μm, and said second thickness is about 13.5 μm, and said third thickness is about 13 μm.

3. A method as claimed in claim 1, wherein after removal of said first silica film and prior to deposition of said third silica film, a first protective film is deposited on said second silica film to protect said second silica film against subsequent etching.

4. A method as claimed in claim 3, wherein said first protective film is silicon nitride.

5. A method as claimed in claim 3, wherein a second protective film is deposited on said front face after removal of said first silica film and prior to deposition of said third silica film.

6. A method as claimed in claim 5, wherein said first and second protective films are silicon nitride.

7. A method as claimed in claim 5, wherein said water is subject to high frequency cleaning prior to deposition of said first and second protective films.

8. A method as claimed in claim 1, wherein said first film is removed by a buffered oxide etch prior.

9. A method as claimed in claim 1, wherein said second and third films are deposited by PECVD.

10. A method as claimed in claim 1, wherein said high temperature anneal takes place between 600 and 900° C.

11. A method as claimed in claim 1, wherein said first, second and third films are doped with the same species of dopant.

* * * * *